L. ZSIDAKOVITZ.
SALT SHAKER.
APPLICATION FILED JUNE 15, 1914.

1,171,575.

Patented Feb. 15, 1916.

Witnesses:
Eugene Farkas.
Julius Farkas.

Inventor.
Louis Zsidakovitz.

UNITED STATES PATENT OFFICE.

LOUIS ZSIDAKOVITZ, OF NEWARK, NEW JERSEY.

SALT-SHAKER.

1,171,575.  Specification of Letters Patent.  Patented Feb. 15, 1916.

Application filed June 15, 1914. Serial No. 845,217.

*To all whom it may concern:*

Be it known that I, LOUIS ZSIDAKOVITZ, a citizen of the United States, and a resident of Newark, in the county of Essex and State of New Jersey, have invented certain new and useful Improvements in Salt-Shakers, of which the following is a specification.

The objects of this invention are to provide an improved shaker for salt or the like; to provide improved means for retaining the dispensing plunger in closed position; to provide a guide for the plunger adapted to be held in position by the glass casing; to cause the plunger head to drag upon the side of its seat in operation of the device and thus discharge the salt better; to retain the guide in position by the pressure of the spring which retains the plunger closed; to provide improved means for filling the shaker from its top without disturbing the plunger; to adapt the plunger to be readily removed for cleaning; to protect the spring and prevent it from collecting dust and dirt; to secure simplicity of construction and operation, and to obtain other advantages and results as may be brought out in the following description.

Figure 1:
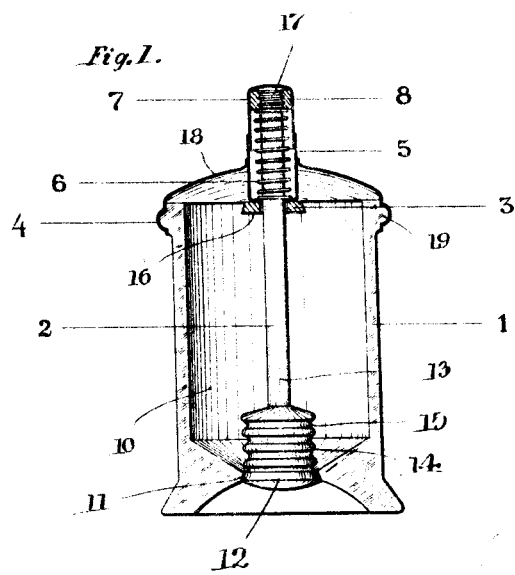
Figure 2:
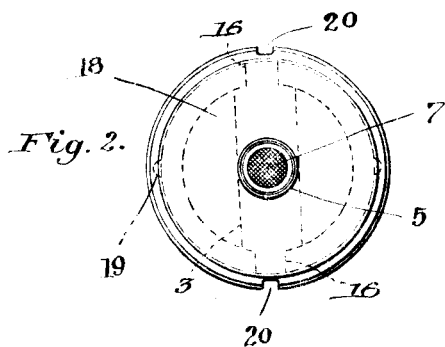

Referring to the accompanying drawing, in which like numerals of reference indicate the same parts throughout the several views, Figure 1 is a vertical central section of a salt shaker embodying my invention, and Fig. 2 is a plan view of the same.

In the specific embodiment of the invention the reference numeral 1 indicates a receptacle or casing preferably made of glass and of suitable size and shape for the purpose. Said casing provides an interior chamber 10 for receiving the material such as salt which is to be distributed from time to time. This casing is apertured at its bottom, as at 11 and provides an inwardly tapered seat thereat against which the outer enlarged end 12 of a plunger 13 will seat upwardly to close the aperture. Above the enlarged end 12, the plunger provides a plurality of circumferential beads 14 spaced apart and alternating with grooves 15 therebetween. These beads are large enough in diameter to substantially fill the aperture 11 when passing therethrough, so that when the plunger is depressed, removing the enlarged end 12 from its seat, only the salt or other material carried within the grooves 15 which are depressed below the seat 11 is discharged from the receptacle. Obviously if the plunger is depressed only far enough to discharge the salt in the lowest groove less salt will be had than if the plunger were lowered to discharge the salt from all of the grooves, and in this way any desired amount of salt or other material may be obtained. Preferably the lower wall of the receptacle slopes radially inward and downward to the central aperture, and below the seat the wall is sloped outwardly away from the aperture, and preferably concave so as to spread the salt with greater regularity. At the top of the casing or receptacle, diametrically opposite notches 16 are provided in the upper edge of the wall, adapted to receive the ends of a transverse guide bar 3. This guide bar is provided with a suitable aperture to slidably receive the reduced shank 2 of the plunger 13, the upper end of which extends above the guide bar and is screw-threaded as at 17.

Seated upon the guide bar 3 is a sleeve 5 through which the stem 2 of the plunger extends axially and which is open at its top and telescopically receives a depending sleeve 7 fast upon a nut 8 screwed upon the threaded end 17 of the plunger. Preferably this sleeve 7 is closed at its top providing thereby a suitable cap or push button for depressing the plunger. The lower end of the sleeve 5 which is seated upon the guide bar 3 preferably turns inward, and seated thereon is the lower end of a spiral spring 6 the upper end of which engages the nut 8. The tendency of the spring is to raise the plunger to hold the enlarged lower end 12 seated, and at the same time the spring presses the lower sleeve 5 downward holding it in position upon the guide bar 3, and also holding the guide bar 3 in position in the notches 16 in the receptacle.

It will be noted that the lower sleeve 5 seats at its bottom loosely upon the guide bar 3 so that it is free to move with respect thereto and enable the plunger rod or stem 2 to move or tilt laterally. This causes the head or enlarged end of the plunger to rub against the side of the opening for it in the bottom of the receptacle and produce a vibration to better dislodge or discharge the salt.

A cover 18 is provided having a central aperture through which the lower sleeve 5 may project. Preferably the periphery of the cover is turned downward over the outside of the receptacle 1, and as shown in the present instance is provided with a peripheral groove 4 therearound adapted to receive diametrically opposite knobs 19 to prevent the covering from being raised when the knobs are within the groove 4. At diametrically opposite points of the cover, the groove is cut away as at 20, 20 so that the cover may be turned until the cut away portions 20, 20 are in registration with the knobs 19 at which time the cover may be raised and taken off the receptacle. As shown in the drawing, there is a space left between the edge of the guide bar 3 and the wall of the receptacle for pouring in salt or other material to fill the receptacle.

It will be noted that the cover 18 may be removed without disturbing the plunger 13 or removing the enlarged head 12 from its seat. Furthermore it may be noted that the upper sleeve 7 depends within the lower sleeve 5 and the center of the cover 18 engages closely with the sleeve 5, so that no salt or other material can spill out of the same and at the same time the sleeve 7 is free to be depressed or raised as desired.

Obviously detail modifications and changes may be made in manufacturing my improved salt shaker without departing from the spirit and scope of the invention, and I do not wish to be understood as restricting myself except as required by the following claim when construed in the light of the prior art.

Having thus described the invention, what I claim is:—

In a device of the character described, the combination with a receptacle apertured at its bottom, a plunger having a head adapted to be raised to close said aperture, a transverse guide bar at the upper end of said receptacle, a sleeve around said plunger above the guide bar free to move with respect to both said parts and having at its lower end an inwardly directed flange adapted to seat upon said guide bar, whereby the sleeve is free to tilt laterally with respect to said guide bar, a nut on the end of the plunger above said guide bar and sleeve, an upper sleeve depending from said nut into telescopic relation to the said lower sleeve, and a spring on said plunger within said sleeves engaging at its upper end the underside of said nut and at its lower end engaging the said inwardly directed flange of the lower sleeve, said spring thereby tending to hold the sleeve seated upon the guide bar axially of the plunger and the guide bar seated upon the top of the receptacle and the plunger raised.

LOUIS ZSIDAKOVITZ.